July 25, 1950    M. B. HERSCHER ET AL    2,516,771
INDICATOR DEVICE
Filed Nov. 8, 1947
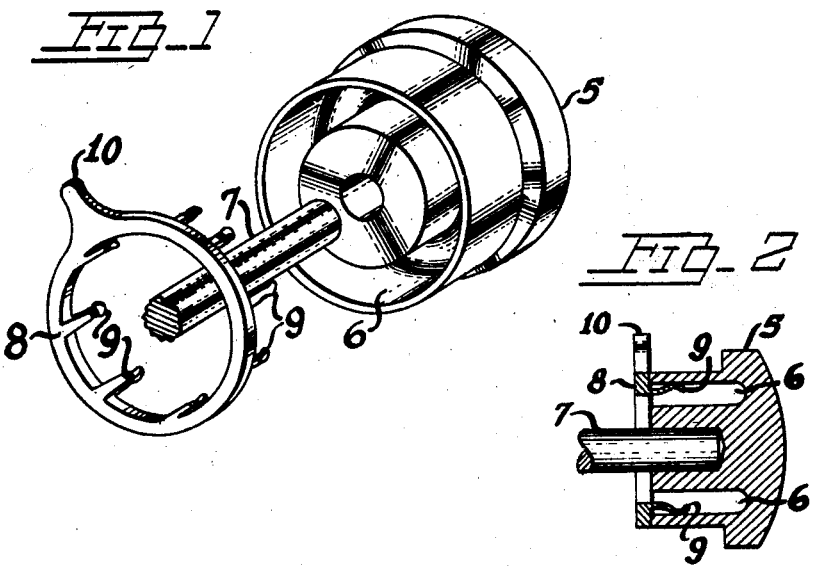
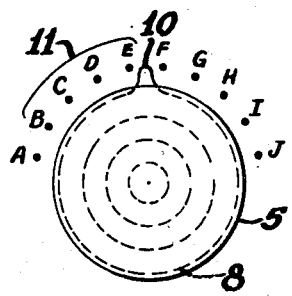
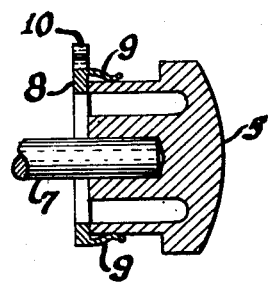
Inventors
Marcus B Herscher, &
Raphael F. Bov
By Conder C. Henry
Attorney Patented July 25, 1950

2,516,771

UNITED STATES PATENT OFFICE 2,516,771

INDICATOR DEVICE

Marcus B. Herscher, Camden, and Raphael F. Bov, Oaklyn, N. J., assignors to Radio Corporation of America, a corporation of Delaware Application November 8, 1947, Serial No. 784,830

8 Claims. (Cl. 116—124.2)

Our invention relates to indicating devices and more particularly to adjustable indicating devices for knobs.

In the prior art it has been customary to use a knob having a pointer formed integrally therewith. In electrical test instruments, or in radio equipment, it is often necessary to adjust the pointer to a definite point of reference. Performing such an adjustment upon the integral knob and pointer of the prior art devices requires loosening the knob from the shaft and reclamping it in the new position.

It is an object of our invention to provide a combined knob and pointer which are adjustable with respect to each other.

It is a further object of our invention to provide a pointer for knobs which is simple in construction, readily attachable, easily adjustable, inexpensive to produce, and lends itself readily to mass production methods.

Certain details of construction, together with other objects and advantages, will be apparent and our invention itself will be best understood by reference to the following description read in connection with the accompanying drawings, wherein:

Figure 1 is an exploded view of our invention;

Figure 2 is a sectional side view of our invention in its assembled relation;

Figure 3 is a sectional side view of a modification of the device illustrated by Figure 1; and, Figure 4 is a front view of our invention illustrating its use in connection with a dial.

Referring to Figure 1, the knob 5 is of conventional construction and is provided with a concentric depression 6 on its rear side and with means whereby it may be attached to a control shaft 7. The pointer comprises a ringlike body portion 8 having a plurality of resilient tongues 9 formed integrally therewith and extending substantially perpendicular thereto. One of the tongues 10 is formed so as to extend substantially radially beyond the body portion and constitutes the indicator element.

As shown in Figure 2, the resilient tongue members 9 are designed to snap into the concentric depression of the knob, whereas, in Figure 3, the tongue members are fashioned to snap over the shoulder of the knob. In either case, in its assembled relation the body portion of the pointer lies against the rear surface of the knob, and the indicator element extends beyond the periphery of the knob.

The operation and use of our invention may best be understood by reference to Figure 4 wherein the indicator element can be seen pointing toward a scale 11. As an illustration assume that the knob is attached to the volume control shaft of an amplifier designed for use in sound level measurements. When the knob and the shaft upon which it is mounted have been adjusted for the desired sound level output, the pointer can be rotated with respect to the knob while the latter is held stationary.

Our indicating device can be used to advantage in instances where attachment is made to a noncircular shaft of a switching device or control element; because, mounting of the latter devices is not limited to a single position to insure alignment of scale and indicator element in a readable position.

It is to be understood that the form of our invention herewith shown and described, is to be taken as a preferred example of the same, and that various changes in shape, size and arrangement of parts may be resorted to, without departing from the spirit of our invention, or the scope of the subjoined claims.

Having thus described our invention, we claim:

1. A pointer for an indicating device comprising a ring-like body portion, and a plurality of circumferentially spaced tongues integrally attached to said ring-like body portion, one of said tongues extending radially from said ring-like body portion to provide an indicator element, and the remainder of said tongues extending in a substantially axial direction from said ring-like body portion to provide gripping tongues.

2. An indicator device comprising a knob having a circular periphery and a pointer, the said pointer comprising a ring-like body portion and a plurality of circumferentially spaced tongues integrally attached to said ring-like body portion, one of said tongues extending radially from said ring-like body portion to provide an indicator element, and the remainder of said tongues extending in a substantially axial direction from said ring-like body portion and frictionally engaging said periphery of said knob.

3. An indicator device comprising a knob having a circular periphery and a pointer, the said pointer comprising a ring-like body portion and a plurality of circumferentially spaced tongues integrally attached to said ring-like body portion, one of said tongues extending radially from said ring-like body portion to provide an indicator element, and the remainder of said tongues extending in a substantially axial direction from said ring-like body portion and frictionally engaging said periphery of said knob, the said pointer being rotatably adjustable with respect to the said knob.

4. In combination a knob having a cylindrical protrusion from one face thereof, and a pointer, said pointer comprising a ring-like body portion and a plurality of circumferentially spaced tongues integrally attached to said ring-like body portion, one of said tongues extending radially from said ring-like body portion to provide an indicator element, and the remainder of said tongues extending in a substantially axial direction from said ring-like body portion and frictionally engaging the inner surface of said cylindrical protrusion.

5. In combination a knob having a cylindrical protrusion from one face thereof, and a pointer, said pointer comprising a ring-like body portion and a plurality of circumferentially spaced tongues integrally attached to said ring-like body portion, one of said tongues extending radially from said ring-like body portion to provide an indicator element, and the remainder of said tongues extending in a substantially axial direction from said ring-like body portion and frictionally engaging the inner surface of said cylindrical protrusion, the said pointer being rotatably adjustable with respect to the said knob.

6. In combination a knob having a peripheral shoulder, and a pointer, the said pointer comprising a ring-like body portion and a plurality of circumferentially spaced tongues extending radially from said ring-like body portion to provide an indicator element, and the remainder of said tongues extending in a substantially axial direction from said ring-like body portion and frictionally engaging the said peripheral shoulder.

7. In combination a knob having a peripheral shoulder, and a pointer, the said pointer comprising a ring-like body portion and a plurality of circumferentially spaced tongues extending radially from said ring-like body portion to provide an indicator element, and the remainder of said tongues extending in a substantially axial direction from said ring-like body portion and frictionally engaging the said peripheral shoulder, the said pointer being rotatably adjustable with respect to the said knob.

8. A method of making an indicator comprising the steps of stamping from sheet material an annular ring having a plurality of tongues radially extending therefrom forming from one of said tongues an indicator element extending beyond the outer diameter of said annulus in a radial direction and bending the remainder of said tongues into planes perpendicular to the plane of said annulus.

MARCUS B. HERSCHER.
RAPHAEL F. BOV.

REFERENCES CITED

The following references are of record in the file of this patent:

UNITED STATES PATENTS

| Number | Name | Date |
|---|---|---|
| 2,041,106 | Barry | May 19, 1936 |

FOREIGN PATENTS

| Number | Country | Date |
|---|---|---|
| 642,962 | France | May 10, 1928 |